(12) United States Patent
Sato et al.

(10) Patent No.: US 11,549,018 B2
(45) Date of Patent: Jan. 10, 2023

(54) PIGMENT COMPOSITION

(71) Applicant: Sanyo Color Works, Ltd., Hyogo (JP)

(72) Inventors: Junichiro Sato, Hyogo (JP); Takeshi Nishikawa, Hyogo (JP)

(73) Assignee: Sanyo Color Works, Ltd., Hyogo (JP)

( * ) Notice: Subject to any disclaimer, the term of this patent is extended or adjusted under 35 U.S.C. 154(b) by 1004 days.

(21) Appl. No.: 16/204,873

(22) Filed: Nov. 29, 2018

(65) Prior Publication Data

US 2019/0264030 A1   Aug. 29, 2019

(30) Foreign Application Priority Data

Dec. 1, 2017  (JP) .............................. JP2017-231733

(51) Int. Cl.
| | | |
|---|---|---|
| C09D 11/00 | (2014.01) | |
| C09B 29/033 | (2006.01) | |
| C09B 29/34 | (2006.01) | |
| C09D 11/328 | (2014.01) | |
| G03G 9/09 | (2006.01) | |
| C09B 29/33 | (2006.01) | |
| C09B 41/00 | (2006.01) | |
| C09B 67/22 | (2006.01) | |
| C09D 11/322 | (2014.01) | |
| C08K 5/3492 | (2006.01) | |
| C09D 1/00 | (2006.01) | |
| C09D 4/00 | (2006.01) | |
| C09D 5/00 | (2006.01) | |
| C09K 3/00 | (2006.01) | |

(52) U.S. Cl.
CPC ........ *C09B 29/0096* (2013.01); *C08K 5/3492* (2013.01); *C09B 29/337* (2013.01); *C09B 29/34* (2013.01); *C09B 41/001* (2013.01); *C09B 67/0041* (2013.01); *C09D 11/322* (2013.01); *C09D 11/328* (2013.01); *G03G 9/091* (2013.01); *G03G 9/0914* (2013.01)

(58) Field of Classification Search
USPC ....................... 106/31.01, 31.13, 31.6, 31.77
See application file for complete search history.

(56) References Cited

FOREIGN PATENT DOCUMENTS

| | | | |
|---|---|---|---|
| EP | 1054042 A1 | | 11/2000 |
| GB | 602886 A | * | 7/1946 |
| JP | 3232931 B2 | | 9/2001 |
| JP | 2011-32374 A | | 2/2011 |
| JP | 2013-082807 A | | 5/2013 |
| JP | 2017-075300 A | | 4/2017 |

* cited by examiner

*Primary Examiner* — James E McDonough
(74) *Attorney, Agent, or Firm* — Fitch, Even, Tabin & Flannery LLP

(57) ABSTRACT

A pigment composition contains: an azo pigment that is a reaction product between a coupler and a base; and a pigment derivative, and a content of o-anisidine derived from the coupler is less than or equal to 20 mg/kg in the entire pigment composition. A method for producing the pigment composition includes, after reaction between a coupler and a base to generate an azo pigment, or during the reaction between the coupler and the base, adding a remover for o-anisidine derived from the coupler.

6 Claims, No Drawings

PIGMENT COMPOSITION

CROSS-REFERENCE TO RELATED APPLICATION

This application is based upon and claims the benefit of priority from the prior Japanese Patent Application No. 2017-231733, filed Dec. 1, 2017, the entire content of which is incorporated herein by reference.

BACKGROUND OF THE INVENTION

Field of the Invention

The present invention relates to a pigment composition, and particularly relates to a pigment composition containing an azo pigment.

Description of the Background Art

Azo dyes are widely used as dyes for dyeing fibers, pigments for paints, pigments for color toner, pigments for inkjet ink, pigments for color filters for liquid crystal display devices, etc. Such an azo dye is generally synthesized by reaction of a coupler and a base. It is pointed out that the by-product generated during the reaction may deteriorate characteristics in various uses or have effects on human health, environment, etc. Therefore, methods for removing the by-product, etc., have been proposed (see, for example, Patent Literature 1 and 2).

In particular, for human health, there are concerns about the carcinogenicity of the by-product. It is known that the azo bonds (—N═N—) contained in azo dyes are reduced by action of enzymes of bacteria on the skin surface, enteric bacteria, the liver, etc., and the double bonds between nitrogen atoms are broken to generate amines. Among these amines, there is a concern that specific aromatic amines such as o-anisidine have carcinogenicity. Such specific aromatic amines are included in the list of carcinogenic risks announced by the International Agency for Research on Cancer (IARC), which is an outside agency of the World Health Organization. Thus, from the viewpoint of prevention, in countries all over the world, use of azo dyes is regulated by each country's laws. For example, in the European Union, 22 aromatic amines are targets to be regulated in REACH, and a regulation value is set to 30 mg/kg. In China, 24 aromatic amines are targets to be regulated, and a regulation value is set to 20 mg/kg. Moreover, in Japan and South Korea, 24 aromatic amines are targets to be regulated, and a regulation value is set to 30 mg/kg.

CITATION LIST

Patent Literature

[PTL 1] Japanese Laid-Open Patent Publication No. 2017-75300
[PTL 2] Japanese Laid-Open Patent Publication No. 2013-82807

SUMMARY OF THE INVENTION

However, for example, with the treatment described in Patent Literature 1 and 2, removal of a specific aromatic amine such as o-anisidine is difficult or not sufficient. Therefore, an object of the present invention is to provide a pigment composition having a reduced content of o-anisidine as compared to that in the conventional art, and to provide a production method that allows o-anisidine to be efficiently removed in producing the pigment composition.

The present inventors have conducted thorough research to solve the above-described problems. As a result, the present inventors have found that, by using a predetermined remover in reacting a coupler and a base with each other to produce an azo pigment, it is possible to efficiently remove o-anisidine, which is a by-product, and make the content of o-anisidine equal to or less than the regulation values.

A first aspect of the present invention is directed to a pigment composition containing: an azo pigment that is a reaction product between a coupler and a base; and a pigment derivative, wherein a content of o-anisidine derived from the coupler is less than or equal to 20 mg/kg in the entire pigment composition.

In an embodiment of the present invention, the pigment derivative may be a triazine compound represented by formula (1) below.

[Chem. 1]

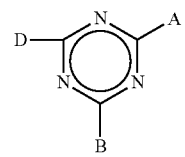

(1)

(In formula (1), A represents an acidic group or a basic group. B represents —OH, —Cl, an acidic group, or a basic group. D represents —H, —Cl, —OH, or an aromatic amine residue).

A second aspect of the present invention is directed to a method for producing a pigment composition, the method including, after reaction between a coupler and a base to generate an azo pigment, or during the reaction between the coupler and the base, adding a compound represented by formula (a) below as a remover for o-anisidine derived from the coupler.

[Chem. 2]

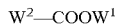

(a)

(In formula (a), $W^1$ represents an aliphatic hydrocarbon group. $W^2$ represents a group having at least one carboxylic acid alkyl ester group, or an aliphatic hydrocarbon group having two or more carbon atoms.)

In an embodiment of the present invention, the compound represented by formula (a) which is added as the remover for o-anisidine may be at least one member selected from dibutyl maleate, diethyl sebacate, dibutyl phthalate, and butyl decanoate. In addition, in an embodiment of the present invention, the method may include performing heating in the presence of the remover for o-anisidine.

A third aspect of the present invention is directed to a toner containing the pigment composition.

A fourth aspect of the present invention is directed to an inkjet ink containing the pigment composition.

According to the present invention, it is possible to provide a pigment composition in which the content of o-anisidine is reduced as compared to that in the conventional art and is less than or equal to the regulation values.

In addition, it is possible to provide a production method that allows o-anisidine to be efficiently removed in producing the pigment composition.

DESCRIPTION OF THE PREFERRED EMBODIMENTS

Hereinafter, an embodiment of the present invention will be described.

A pigment composition according to the embodiment of the present invention contains: an azo pigment that is a reaction product between a coupler and a base: and a pigment derivative, and the content of o-anisidine derived from the coupler is less than or equal to 20 mg/kg in the entire pigment composition.

The content of o-anisidine in the pigment composition is less than or equal to the regulation values as described above, and thus the content of o-anisidine contained in a member that includes the pigment composition can be less than the regulation values. In addition, since the pigment derivative is contained, the influence on characteristics in various uses can be reduced.

The content of o-anisidine in the pigment composition can be measured by comparison between a calibration curve created using standard samples and a result of a measurement sample in a measurement method by high performance liquid chromatography (HPLC). For example, standard solutions and measurement samples are prepared by the following procedure, and measurement by HPLC can be carried out using these samples under the following measurement conditions.

<Preparation of Standard Solutions> o-anisidine is dropped and weighed into a volumetric flask using a Komagome type pipette such that the weight thereof is about 100 mg. Acetonitrile is added thereto such that the total volume is 50 ml. This solution is diluted 10-fold, 100-fold, 1000-fold, and 4000-fold. The respective diluted solutions are filtered using a 0.45-μm membrane filter made of PTEE, and the resultant filtrates are put into 2-ml screw vials and used as standard samples.

<Preparation of Measurement Sample>

1.0 g of a sample is weighed in a vial made of PP, 50 ml of acetonitrile is added thereto using a transfer pipette, and the vial is shaken by a shaker at 250 rpm for 30 minutes. The vial is centrifuged at 5000 rpm for 30 minutes to sediment insoluble matter. The supernatant liquid is filtered using a 0.45-μm membrane filter, and the resultant filtrate is put into a 2-ml vial and used as a measurement sample.

<Measurement Conditions>

Instrument: alliance e2695 Separations Module, manufactured by Waters

Column: ZORBAX Extend C18

Temperature: 40° C.

Mobile phase:

Eluate 1 30 mM ammonium acetate aqueous solution (pH 5.40 to 5.60)

Eluate 2 methanol

| Gradient liquid feed conditions | | |
| --- | --- | --- |
| time (min) | eluate 1 (vol %) | eluate 2 (vol %) |
| 0 | 90 | 10 |
| 5 | 90 | 10 |
| 20 | 0 | 100 |
| 30 | 0 | 100 |

Flow rate: 0.3 mL/min

Injection amount: 5 μL

Detection: PDA 232 nm

The azo pigment is a reaction product between the coupler and the base, and o-anisidine derived from the coupler is generated as the by-product during the reaction.

The coupler is a compound that can generate o-anisidine during coupling reaction with the base. An example of such a coupler is 2-methoxy-acetoacetanilide.

The base is a coupling component that generates a diazonium salt and causes coupling reaction with the above-described coupler. Examples of such a base include dichlorobenzidine hydrochloride, 4-methoxy-2-nitroaniline, 4-chloro-2-nitroaniline, 2-methoxy-4-nitroaniline, and 2-nitro-4-toluidide, which are used for synthesis of an azo pigment.

Examples of the azo pigment include monoazo pigments and disazo pigments. When examples of the azo pigment are shown by color index numbers, such examples include C. I. Pigment YELLOW 17, 65, 73, 74, 105, 127, and 203.

The particle diameter of the azo pigment can be determined as appropriate according to use or the like, and, generally, the average particle diameter of primary particles, that is, the average primary particle diameter, may be 20 to 200 nm. In addition, for example, in use for toner or use for inkjet ink, the average primary particle diameter may be 20 to 150 nm from the viewpoint of clearness or discharge stability. Moreover, in use for a color filter, the average primary particle diameter may be 20 to 80 nm from the viewpoint of obtaining a higher OD value during formation of a coating film. The average primary particle diameter can be calculated, for example, as the arithmetic mean of the maximum widths of a plurality of (for example, 50) primary particles in an image captured by a transmission electron microscope (TEM).

The content of the azo pigment in the pigment composition can be determined as appropriate according to use, product form, or the like.

In the case of using the pigment composition for various uses, the pigment derivative can reduce the influence on characteristics in the various uses that is caused by performing a treatment with an o-anisidine remover described later. In particular, the present inventors have confirmed that, when a treatment with the o-anisidine remover is performed, the azo pigment tends to aggregate, so that application to various uses becomes difficult in some cases. For example, in the case of toner or inkjet ink, a color reproduction range tends to be narrower, or clearness tends to decrease, due to the aggregation. Moreover, in the case of a color filter, the azo pigment cannot be stably dispersed, so that contrast tends to decrease. On the other hand, when the pigment derivative is used, even if a treatment with the o-anisidine remover is performed, aggregation of the azo pigment can be inhibited, so that decrease in characteristics in various uses due to aggregation or an increase in primary particle diameter can be inhibited.

Examples of the pigment derivative include (i) a compound that has a pigment as a base skeleton and in which an acidic group, a basic group, or an aromatic group is introduced as a substituent to a side chain. (ii) a compound that has an aromatic polycyclic compound, such as naphthalene-based, anthraquinone-based, and quinoline-based compounds, which are generally not called pigments, as a base skeleton and in which an acidic group, a basic group, or an aromatic group is introduced as a substituent to a side chain; and (iii) a triazine compound represented by formula (1) below. Examples of the pigments that are the base skeletons in (i) and (ii) include quinacridone pigments, phthalocyanine pigments, azo pigments, quinophthalone pigments, isoindolin pigments, isoindolinone pigments, quinoline pigments, diketo pyrrolo pyrrole pigments, benzimidazolone pigments, and dioxazine pigments. Among the compounds (i) to (iii), the pigment derivative may be the triazine compound represented by formula (1) below from the viewpoint of effectively maintaining characteristics in various uses even when a treatment with the o-anisidine remover is performed.

[Chem. 3]

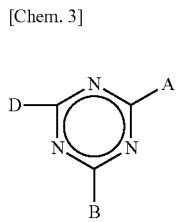

(1)

(In formula (1), A represents an acidic group or a basic group. B represents —OH, —Cl, an acidic group, or a basic group. D represents —H, —Cl, —OH, or an aromatic amine residue.)

The triazine compound represented by the above formula (1) will be described in detail below.

In formula (1), D only needs to be —H, —Cl, —OH, or an aromatic amine residue. D may be the aromatic amine residue among them, from the viewpoint of more effectively maintaining characteristics in various uses. Examples of the aromatic amine residue include residues represented by formulas (2), (3), (5), and (6) below.

[Chem. 4]

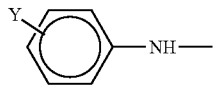

(2)

(In formula (2), Y represents —H, —OH, —NH$_2$, or —N=N-E$^1$ (E$^1$ represents a residue of the coupler).)

[Chem. 5]

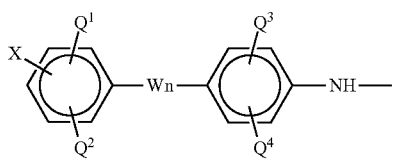

(3)

(In formula (3), $Q^1$, $Q^2$, $Q^3$, and $Q^4$ each independently represent —H, a halogen atom, a lower alkyl group having 1 to 4 carbon atoms, or a lower alkoxy group having 1 to 4 carbon atoms. X represents —H, —OH, —NH$_2$, or —N=N-E$^2$ (E$^2$ represents a residue of the coupler). W represents —CH$_2$—, —O—, —SO$_2$—, or formula (4), and "n" represents an integer from 0 to 2.)

[Chem. 6]

(4)

[Chem. 7]

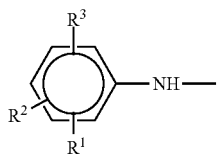

(5)

(In formula (5), $R^1$, $R^2$, and $R^3$ each independently represent —H, —Cl, —NO$_2$, —NH$_2$, a lower alkyl group having 1 to 4 carbon atoms, a lower alkoxy group having 1 to 4 carbon atoms, —CF$_3$, —SO$_3$H, —SO$_2$N(C$_2$H$_5$)$_2$, —COOH, —COOCH$_3$, —CONH$_2$, —SO$_2$—NH$_2$-Ph$^1$ (Ph$^1$ represents a phenyl group), —CONH-Ph$^2$ (Ph$^2$ represents a phenyl group that may have a substituent of —H, —Cl, or —CH$_3$), or —N=N-E$^3$ (E$^3$ represents a residue of the coupler).)

[Chem. 8]

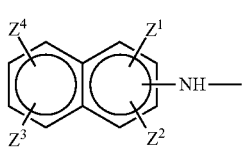

(6)

(In formula (6), $Z^1$, $Z^2$, $Z^3$, and $Z^4$ each independently represent —H, —Cl, —OH, —NH$_2$, —SO$_3$H, —COOH, or —N=N-E$^4$ (E$^4$ represents a residue of the coupler).)

D in formula (1) only needs to satisfy the above structures. Here, D may be aromatic amine residues represented by formulas (7a) to (9) from the viewpoint of more effectively maintaining characteristics in various uses.

[Chem. 9]

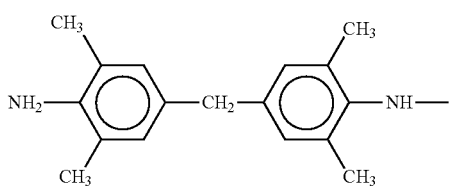

(7a)

[Chem. 10]

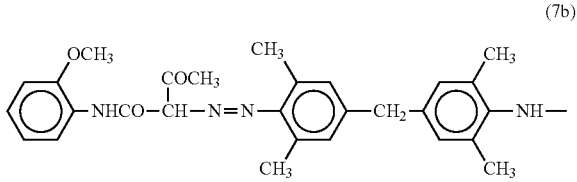

(7b)

[Chem. 11]

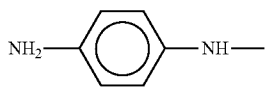
(8)

[Chem. 12]

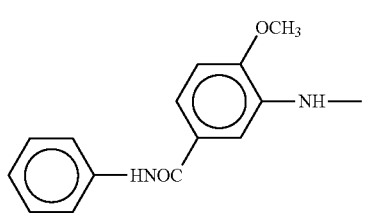
(9)

[Chem. 13]

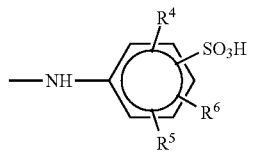
(10)

[Chem. 14]

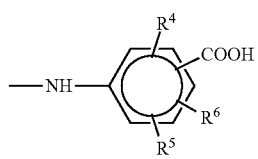
(11)

(In formulas (10) and (11), $R^4$, $R^5$, and $R^6$ each independently represent —H, —$NO_2$, —Cl, a lower alkyl group having 1 to 4 carbon atoms, a lower alkoxy group having 1 to 4 carbon atoms, —$CF_3$, —$SO_3H$, —$SO_2N(C_2H_5)_2$, —COOH, —$COOCH_3$, —$CONH_2$, —$SO_2$—$NH_2$-$Ph^3$ ($Ph^3$ represents a phenyl group), or —CONH-$Ph^4$ ($Ph^4$ represents a phenyl group that may have a substituent of —H, —Cl, or —$CH_3$).)

In formula (1), A only needs to be an acidic group or a basic group, and examples thereof include a carboxyl group, a sulfonic acid group, and a hydrocarbon group having a carboxyl group and/or a sulfonic acid group as a substituent. The hydrocarbon group may be aliphatic or may be aromatic. From the viewpoint of more effectively maintaining characteristics in various uses, A may be a hydrocarbon group having a carboxyl group and/or a sulfonic acid group as a substituent, an aromatic hydrocarbon group having a carboxyl group and/or a sulfonic acid group as a substituent, and an acidic group selected from groups represented by formulas (10) and (11) below, among the carboxyl group, the sulfonic acid group, and the hydrocarbon group having a carboxyl group and/or a sulfonic acid group as a substituent.

The basic group may be a group having an amine basic group, and specifically, may be any basic group selected from —NH—$(CH_2)_3$—$N(CH_3)_2$, —NH—$(CH_2)_3$—N$(C_2H_5)_2$, —NH—$(CH_2)_3$—$N(C_3H_7)_2$, and —NH—$(CH_2)_3$—$N(C_4H_9)_2$.

In formula (1), B only needs to be —OH, —Cl, an acidic group, or a basic group. When B is an acidic group or a basic group, for example, the acidic group and the basic group that are exemplified for A can be selected independently of A.

The triazine compound represented by formula (1) only needs to be a compound having the above structure. Here, specific examples thereof include triazine compounds represented by formulas (12) to (19) below.

[Chem. 15]

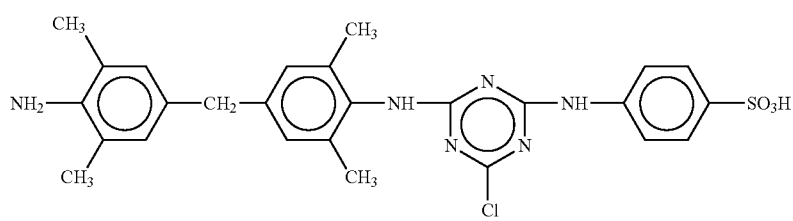
(12)

[Chem. 16]

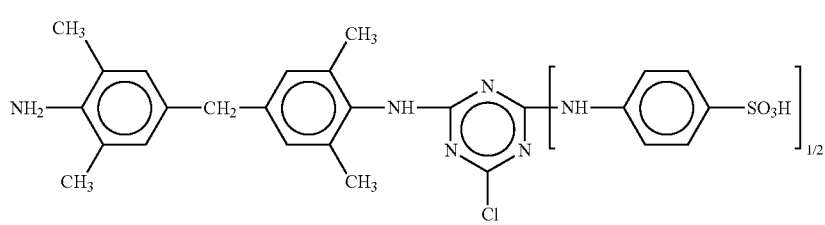
(13)

-continued

[Chem. 17]

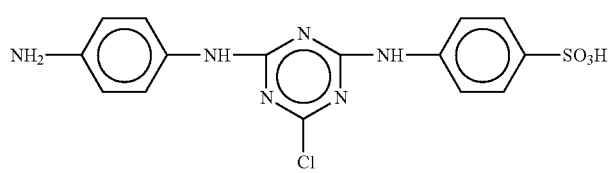

(14)

[Chem. 18]

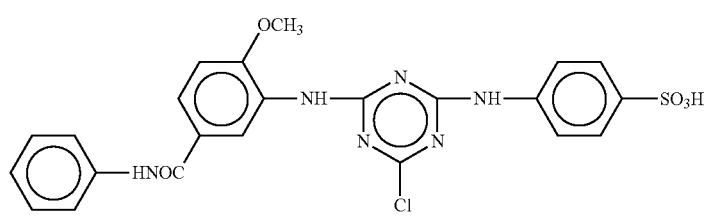

(15)

[Chem. 19]

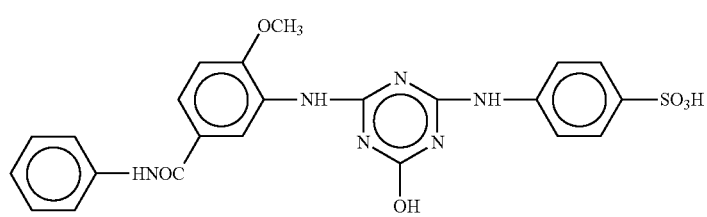

(16)

[Chem. 20]

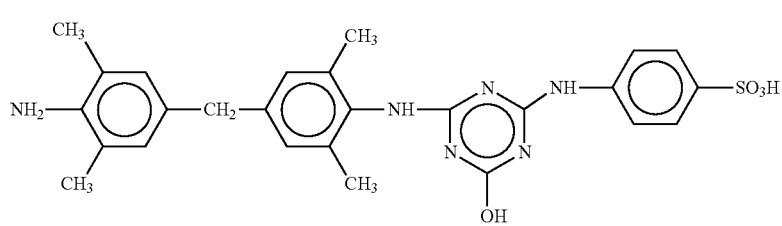

(17)

[Chem. 21]

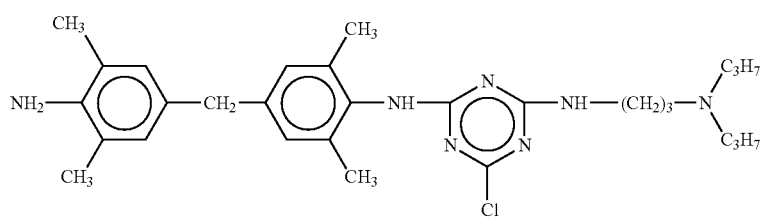

(18)

[Chem. 22]

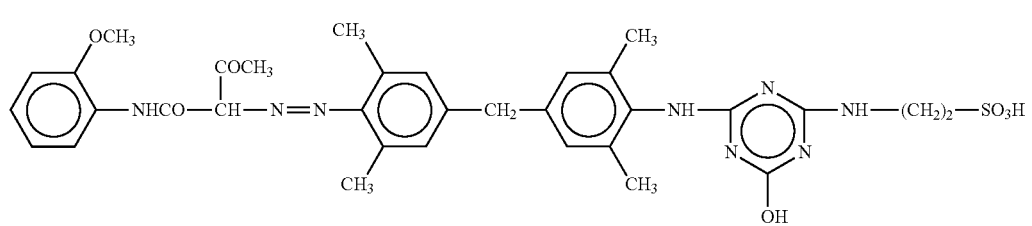

(19)

Specific examples of pigment derivatives other than the triazine compound represented by formula (1) include pigment derivatives described in Japanese Laid-Open Patent Publication No. H11-49974, Japanese Laid-Open Patent Publication No. H11-189732, Japanese Laid-Open Patent Publication No. H10-245501, Japanese Laid-Open Patent Publication No. 2006-265528, Japanese Laid-Open Patent Publication No. H8-295810, Japanese Laid-Open Patent Publication No. H11-199796, Japanese Laid-Open Patent Publication No. 2005-234478, Japanese Laid-Open Patent Publication No. 2003-240938, Japanese Laid-Open Patent Publication No. 2001-356210. International Publication No. 2009/081930, Japanese Laid-Open Patent Publication No. 2004-091497, etc.

The contained amount of the pigment derivative per 100 parts by weight of the pigment may be 0.1 to 20 parts by weight and may be 1 to 15 parts by weight. In the case where a pigment other than the azo pigment is contained as the pigment as described later, the entire pigment in the composition is used as a reference.

The pigment composition is obtained by performing a treatment with a specific o-anisidine remover as described later. Therefore, the pigment composition can contain the specific o-anisidine remover that is used at the stage of production thereof. The o-anisidine remover will be described in detail later.

In addition to the above-described components, the pigment composition may contain other components according to various uses or the like. Examples of such components include a colorant other than the azo pigment, a dispersant, a dispersion aid other than the pigment derivative, a solvent, a coating film forming component (a resin, a photo-polymerizable component, etc.), a sensitizer (sensitizing dye), a chain transfer agent, a fluorine type organic compound, a thermal polymerization initiator, a thermal polymerization component, a surfactant other than the dispersant, an adhesion accelerator, an antioxidant, an aggregation preventing agent, a surface control agent (leveling agent), a filler, a binding resin, a charge control agent, a plasticizer, an abrasive, an electrostatic property improving agent, and a cleaning improver. In addition, the contained amounts of these components can be determined as appropriate according to use or the like.

The colorant other than the azo pigment is not particularly limited, and examples of the colorant include pigments other than the azo pigment, and dyes. The pigments may be organic pigments or inorganic pigments. As the organic pigments, various colored organic pigments can be used.

The dispersant is not particularly limited, and can be selected as appropriate in consideration of the type of the azo pigment or the like. Examples of the dispersant include resin-type dispersants and surfactant-type dispersants. Such a dispersant can be applied, for example, to the case of dispersing the azo pigment, etc., in a solvent.

Examples of the dispersion aid other than the pigment derivative include dispersion resins. Examples of dispersion resins include synthetic resins other than the resin-type dispersants, natural resins such as rosin, and modified products thereof. By using such a dispersion aid, the same advantageous effects as those of the above-described pigment derivative can be expected.

The solvent can be selected as appropriate according to use or the like. Examples of the solvent include various organic solvents such as aromatic solvents, ketone solvents, ester solvents, glycol ether solvents, alcohol solvents, and aliphatic solvents. Such a solvent is used, for example, in preparation of a pigment composition for inkjet ink or for color filters.

The form of the pigment composition can be made into a form such as powder form, paste form, and liquid form by adjusting the component composition. When the pigment composition is in paste form or liquid form, the pigment composition is, for example, a dispersion of a pigment or the like.

The above-described pigment composition can be obtained by a production method including the step of, after the coupler and the base are reacted with each other to produce the azo pigment, or during the reaction between the coupler and the base, adding a compound represented by formula (a) below as a remover for o-anisidine derived from the coupler. The remover may be at least one compound selected from compounds represented by formula (a) below.

[Chem. 23]

$$W^2\text{—COOW}^1 \qquad (a)$$

(In formula (a), $W^1$ represents an aliphatic hydrocarbon group. $W^2$ represents a group having at least one carboxylic acid alkyl ester group, or an aliphatic hydrocarbon group having two or more carbon atoms.)

By using the compound represented by formula (a) as the o-anisidine remover, o-anisidine generated during the reaction between the coupler and the base can be efficiently removed. Thus, the content of o-anisidine in the obtained pigment composition can be reduced so as to satisfy the regulation values.

Such an o-anisidine remover can also efficiently remove other impurities other than o-anisidine generated during coupling reaction of the coupler and the base. Examples of the impurities other than o-anisidine include anisidide compounds represented by formulas (1) and (11) described in Japanese Laid-Open Patent Publication No. 2008-63524, a compound represented by formula (I-1) described in Japanese Laid-Open Patent Publication No. 2016-23267, and aceto-o-anisidide. Therefore, by using the compound represented by formula (a) as the o-anisidine remover, the content of the above other impurities is also reduced in the obtained pigment composition.

$W^1$ in formula (a) only needs to be an aliphatic hydrocarbon group. Here, from the viewpoint of more effectively functioning as the o-anisidine remover. $W^1$ may be an aliphatic hydrocarbon group having 1 to 6 carbon atoms, and may also be an aliphatic hydrocarbon group having 2 to 4 carbon atoms. In addition, the aliphatic hydrocarbon group may be unsaturated or saturated. Here, $W^1$ may be a saturated aliphatic hydrocarbon group. The structure of the aliphatic hydrocarbon group may be a chain or cyclic structure. Here, the saturated aliphatic hydrocarbon group may have a chain structure. In the case of a chain structure, the aliphatic hydrocarbon group may be linear or branched.

$W^2$ may be a group having at least one carboxylic acid alkyl ester group, or an aliphatic hydrocarbon group having two or more carbon atoms.

An example of the group having at least one carboxylic acid alkyl ester group, as $W^2$, is $W^3$—O—CO—$W^4$— ($W^3$ represents an aliphatic hydrocarbon group. $W^4$ represents an aliphatic hydrocarbon group that may have a carboxylic acid and/or carboxylic acid alkyl ester group, or an aromatic hydrocarbon group that may have a carboxylic acid and/or carboxylic acid alkyl ester group).

$W^3$ only needs to be an aliphatic hydrocarbon group. Here, from the viewpoint of more effectively functioning as the o-anisidine remover, $W^3$ may be an aliphatic hydrocarbon group having 1 to 6 carbon atoms, and may also be an aliphatic hydrocarbon group having 2 to 4 carbon atoms.

Examples of $W^4$ include (i) an unsubstituted aliphatic hydrocarbon group or aromatic hydrocarbon group, (ii) an aliphatic hydrocarbon group or aromatic hydrocarbon group substituted with at least one carboxylic acid (carboxyl) group, (iii) an aliphatic hydrocarbon group or aromatic hydrocarbon group substituted with at least one carboxylic acid alkyl ester group, and (iv) an aliphatic hydrocarbon group or aromatic hydrocarbon group substituted with at least one carboxylic acid (carboxyl) group and at least one carboxylic acid alkyl ester group. In the case where $W^4$ includes two or more carboxyl groups, $W^4$ includes an anhydride.

(i) The unsubstituted aliphatic hydrocarbon group which is $W^4$ may be a saturated or unsaturated aliphatic hydrocarbon group having 2 to 22 carbon atoms, and may also be an aliphatic hydrocarbon group having 2 to 16 carbon atoms. The structure of the aliphatic hydrocarbon group may be linear, branched, or cyclic. The unsubstituted aromatic hydrocarbon group may be an aromatic hydrocarbon group having 6 to 22 carbon atoms. Examples thereof include a phenylene group ($—C_6H_4—$), a biphenylene group ($—C_6H_4—C_6H_4—$), a naphthylene group ($—C_{10}H_8—$), $—C_6H_4—W^5—C_6H_4—$ ($W^5$ represents a linking group such as $—CO—$), an anthracene group ($—C_{14}H_{10}—$), and a pentacene group ($—C_{22}H_{14}—$).

An example of (ii) the aliphatic hydrocarbon group or aromatic hydrocarbon group substituted with at least one carboxylic acid (carboxyl) group, which is $W^4$, is a group obtained by substituting at least one of the hydrogen atoms directly bound to the carbon atoms of (i) the above unsubstituted aliphatic hydrocarbon group or aromatic hydrocarbon group, with a carboxyl group. The number of carboxyl groups is not particularly limited, and examples thereof include 1 to 3.

An example of (iii) the aliphatic hydrocarbon group or aromatic hydrocarbon group substituted with at least one carboxylic acid alkyl ester group, which is $W^4$, is a group obtained by substituting at least one of the hydrogen atoms directly bound to the carbon atoms of (i) the above unsubstituted aliphatic hydrocarbon group or aromatic hydrocarbon group, with a carboxylic acid alkyl ester group. An example of the alkyl group in the carboxylic acid alkyl ester group is an alkyl group (saturated aliphatic hydrocarbon group) having 1 to 22 carbon atoms. The structure of the alkyl group may be linear, branched, or cyclic. The number of carboxylic acid alkyl ester groups is not particularly limited, and examples thereof include 1 to 4.

An example of (iv) the aliphatic hydrocarbon group or aromatic hydrocarbon group substituted with at least one carboxylic acid (carboxyl) group and at least one carboxylic acid alkyl ester group, which is $W^4$, is a group obtained by substituting at least two of the hydrogen atoms directly bound to the carbon atoms of (i) the above unsubstituted aliphatic hydrocarbon group or aromatic hydrocarbon group, with the carboxyl group and the carboxylic acid alkyl ester group in the above (ii) and (iii). Each of the numbers of carboxyl groups and carboxylic acid alkyl ester groups is not particularly limited, and examples thereof include 1 to 2.

Regarding the aliphatic hydrocarbon group having two or more carbon atoms which is $W^2$, the number of carbon atoms may be more than or equal to 2 and less than or equal to 21, and may be more than or equal to 2 and less than or equal to 12, from the viewpoint of more effectively functioning as the o-anisidine remover. The structure of the aliphatic hydrocarbon group may be linear, branched, or cyclic. Here, the structure may be linear or branched.

Examples of such an o-anisidine remover represented by formula (a) include an ester of a monocarboxylic acid having three or more carbon atoms and a monohydric alkyl alcohol, and a condensation product that has a polycarboxylic acid having two or more carboxyl groups and has two or more ester bonds obtained by condensation reaction of a monohydric alkyl alcohol and two or more carboxyl groups contained in the polycarboxylic acid. Examples of such a carboxylic acid include propionic acid, butanoic acid (butyric acid), pentanoic acid (valeric acid), hexanoic acid (caproic acid), heptanoic acid, octanoic acid (caprylic acid), nonanoic acid, decanoic acid (capric acid), dodecanoic acid (lauric acid), tetradecanoic acid (myristic acid), hexadecanoic acid (palmitic acid), heptadecanoic acid, octadecanoic acid (stearic acid), ethanedioic acid (oxalic acid), propanedioic acid (malonic acid), butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), fumaric acid, maleic acid, benzoic acid, phthalic acid, isophthalic acid, terephthalic acid, 1,2,3,4-cyclopentane tetracarboxylic dianhydride, 1,2,3,4-cyclobutane tetracarboxylic dianhydride, 3,3',4,4'-benzophenone tetracarboxylic dianhydride, 1,2,4,5-cyclohexane tetracarboxylic acid, naphthalene-1,4,5,8-tetracarboxylic dianhydride, and 3,3',4,4'-biphenyl tetracarboxylic dianhydride. Examples of monohydric alkyl alcohols include methanol, ethanol, 1-propanol, 2-propanol, 1-butanol, 2-methyl-1-propanol, 2-butanol, 2-methyl-2-propanol, I-pentanol, 3-methyl-1-butanol, 2,2-dimethyl-1-propanol, 2-pentanol, 3-methyl-2-butanol, 3-pentanol, 2-methyl-2-butanol, and 1-hexanol.

Such carboxylic acid alkyl esters may include a condensation product that has a polycarboxylic acid having two or more carboxyl groups and has two or more ester bonds obtained by condensation reaction of a monohydric alkyl alcohol and two or more carboxyl groups contained in the polycarboxylic acid.

From the viewpoint of more efficiently removing o-anisidine, examples of the above-described carboxylic acid alkyl ester include dibutyl maleate (DBM), diethyl sebacate (DES), dibutyl phthalate (DBP), and butyl decanoate (BD). Among them, dibutyl maleate, diethyl sebacate, and dibutyl phthalate may be used.

From the viewpoint of more efficiently removing o-anisidine, the added amount of the compound represented by formula (a) during or after coupling reaction may be 2 to 40 parts by weight, may be 2 to 20 parts by weight, and may be 3 to 15 parts by weight, per 100 parts by weight of the pigment. Here. "100 parts by weight of the pigment" is based on the theoretical amount of the azo pigment generated by reacting the coupler and the base with each other. In addition, in the case where the pigment derivative is contained, "100 parts by weight of the pigment" means that the total amount of the pigment and the pigment derivative is 100 parts by weight. The percentage of a contained amount (parts by weight) per 100 parts by weight of the pigment is also referred to as % to pigment.

As the coupler and the base, those described above are used. In addition, the coupling reaction of the coupler and the base can be carried out by a conventionally known method. For example, a coupler solution containing the coupler and a base solution containing a diazotized base are prepared, both solutions are mixed, and coupling reaction of the coupler and the diazotized product of the base is caused to generate an azo pigment. Thereafter, heating may be performed as necessary. The temperature at this time may generally be 70 to 90° C. In addition, the heating time may generally be 30 to 90 minutes. The heating treatment may be performed with agitation.

The mixing ratio of the coupler and the base is not particularly limited. When only the productivity of the azo pigment is taken into consideration, the coupler can be excessively added as compared to the base. From the viewpoint of inhibiting generation of o-anisidine derived from the coupler, an excess amount of the coupler can be reduced as small as possible. Therefore, from the viewpoint of effectively inhibiting generation of o-anisidine and achieving a practically allowable yield of the azo pigment, an excess ratio of the coupler (B) to the base (A) ((B−A)/A× 100) may be greater than 0 and less than or equal to 10 mol %, and may be more than or equal to 0.6 mol % and less than or equal to 7 mol %, on a weight basis.

The coupling reaction of the coupler and the base may be carried out in the presence of the above-described pigment derivative. Accordingly, crystal growth of a generated azo pigment is inhibited, and an azo pigment having small primary particles is obtained. In addition, even when the primary particles of the azo pigment aggregate into secondary particles as a result of performing a treatment with the o-anisidine remover, it is possible to easily return the azo pigment to the state of primary particles by pulverizing the secondary particles. Furthermore, even when the treatment with the o-anisidine remover is performed, it can be also possible to significantly inhibit aggregation of the primary particles of the azo pigment.

The time at which the pigment derivative is added is not particularly limited, and may be any time as long as the pigment derivative is present during the coupling reaction. For example, the pigment derivative may be contained in the coupler solution, and the coupler solution and the diazotized solution may be mixed, or the pigment derivative may be contained in the diazotized solution, and the diazotized solution and the coupler solution may be mixed. In addition, in the case of containing the pigment derivative in the diazotized solution, the pigment derivative may be added and contained before diazotization, or the pigment derivative may be added and contained after diazotization. When the pigment derivative is added and contained before diazotization, $-NH_2$ contained in the pigment derivative can be similarly diazotized depending on the type of the pigment derivative. Thus, the pigment derivative can react with the coupler. For example, in the case where D in formula (1) is an aromatic amine residue having $-NH_2$, $-NH_2$ is diazotized into a diazonium salt, and the diazonium salt and a coupler E react with each other to generate $-N=N-E$ (E is a coupler residue). For example, the aromatic amine residues represented by formulas (2), (3), (5), and (6) contain the product that can be generated during such coupling reaction. Triazine compounds in which D in formula (1) is an aromatic amine residue having a group represented by $-N=N-E^1$ to $E^4$ in these formulas (2), (3), (5), and (6) can correspond to this product. However, these triazine compounds may be prepared in advance, and separately added so as to be present during the coupling reaction.

In the case of adding the pigment derivative, a dispersion aid other than the pigment derivative may be used in combination with the pigment derivative as necessary.

The added amount of the pigment derivative per 100 parts by weight of the base may be 1 to 20 parts by weight and may be 1 to 15 parts by weight. In addition, the added amount of the dispersion aid other than the pigment derivative may be 10 to 50 parts by weight per 100 parts by weight of the base.

The o-anisidine remover represented by formula (a) is added after the coupler and the base are reacted with each other to generate the azo pigment, or to a reaction solution during the reaction between the coupler and the base. The "reaction solution during the reaction between the coupler and the base" means that the o-anisidine remover is present before the coupling reaction of the coupler and the base starts, or during the coupling reaction. Therefore, the o-anisidine remover may be added in advance to a diazotized solution containing the coupler and/or a base solution containing the base, or the o-anisidine remover may be added at one time or at a plurality of times between after the diazotized solution and the base solution are mixed and before the coupling reaction ends. In the case of adding the o-anisidine remover to the reaction solution, the o-anisidine remover can be added with agitation of the reaction solution. After the addition, the agitation may be continued as necessary. From the viewpoint of further improving the efficiency of removing o-anisidine, heating in the presence of the o-anisidine remover may be performed. This heating treatment may be performed as the above-described heating treatment performed as necessary, after the coupling reaction. The conditions for the heating treatment in this case are as described above. After the coupling reaction, the o-anisidine remover may be added after the above-described heating treatment is performed as necessary.

After the o-anisidine remover is added as described above, and the heating treatment and the agitation treatment are performed as necessary, filtration, washing with water, and drying are performed by a conventional method. After the drying, the dried product is pulverized by a dispersing machine such as a roll mill and a bead mill, whereby a pigment composition containing a desired azo pigment and the pigment derivative can be obtained.

The pigment composition obtained as described above itself can be used, for example, as a colorant for toner, for inkjet ink, or for a color filter. In addition, when another component is added to the pigment composition according to use, the pigment composition can be used, for example, as an intermediate raw material for toner, for inkjet ink, or for a color filter, or as toner, inkjet ink, or a color filter.

As additives in use for toner, conventionally known additives can be used. Examples of such additives include a dispersant, a solvent, a binding resin, a charge control agent, a plasticizer, an abrasive, an electrostatic property improving agent, and a cleaning improver. In addition, the added amounts of such additives may be conventionally known contained amounts. The toner can be obtained by, for example, a conventionally known master batch method or the like.

As additives in use for inkjet ink, conventionally known additives can be also used. Examples of such additives include a dispersant, a solvent, a surface tension adjuster, a water-soluble organic solvent, an antiseptic agent, a pH adjuster, and a rust inhibitor. The added amounts of such additives may be also conventionally known contained amounts. The inkjet ink can be also produced according to a conventional method.

In particular, when the above-described method for producing the pigment composition is adopted, there is a concern about a decrease in transparency in the case where toner, inkjet ink, or a color filter is produced using the above-described pigment composition, but a coating film having good transparency that is by no means inferior to that in the case where the above-described method for producing the pigment composition is not adopted, is formed.

EXAMPLES

Hereinafter, the embodiment of the present invention will be described in more detail by means of examples. "%" means "% by weight", and "part(s)" means "part(s) by weight".

(Measurement of o-anisidine)

o-anisidine was measured by the above-described measurement method by HPLC.

(Production Example 1) Production of Pigment Derivative 7.3 parts of cyanuric chloride and 6.8 parts of sulfanilic acid (trade name: ASA Sulfanilic Acid, manufactured by Sugai Chemical Industry Co., Ltd.) whose amount allows for reaction with one Cl atom of cyanuric chloride were added to 100 parts of water and reacted with each other at 20° C. for 1 hour. Next, 10 parts of 4,4'-methylenedi-2,6-xylidine (trade name: KAYABOND C-200S, manufactured by Nippon Kayaku Co., Ltd.) whose amount allows for reaction with one Cl atom of the reaction product was added and reacted with the reaction product at 70° C. for 1 hour. The obtained reaction product was filtered, and the residue was washed with water, and then allowed to stand in a thermostat bath at 80° C. overnight to be dried, to obtain 17.0 parts of the triazine compound represented by the above formula (12).

(Example 1) Production of Pigment Composition 50 parts of 2-methoxy-4-nitroaniline (trade name: Kako Red B Base conc, manufactured by Showa Kako Corporation) which is the base was added to a mixed solution of 400 parts of water and 79 parts of 35% hydrochloric acid, and the solution was agitated. Then, the solution was cooled to 0 to 5° C., 21.5 parts of sodium nitrite was further added to the solution, and the solution was diazotized by a conventional method, to prepare a diazotized solution containing a diazonium salt.

66 parts of 2-methoxy-acetoacetanilide (trade name: Acetoacetic-o-anisidide, manufactured by Mitsuboshi Chemical Co., Ltd.) which is the coupler was added and dissolved in a mixed solution of 300 parts of water and 48 parts of a 30% sodium hydroxide aqueous solution. This solution was added to an aqueous solution obtained by adding 30 parts of sodium acetate to 900 parts of water, and a mixed solution of 150 parts of water and 28 parts of 80% acetic acid was further added thereto to precipitate the coupler. Next, 3 parts of the triazine compound obtained in Production Example 1 was added to the precipitation solution to prepare a suspension (coupler solution).

The diazotized solution was gradually added to the coupler solution at 25° C. with agitation over 120 minutes, to cause coupling reaction of the diazonium salt and the coupler. The excess ratio of the coupler (B) to the base (A) ((B−A)/A× 100) at this time was set to 0.8%. After the coupling reaction, 10 parts (10% to pigment) of dibutyl maleate (DBM) (production name: DBM, manufactured by DAIHACHI CHEMICAL INDUSTRY CO., LTD.) was added as the O-anisidine remover, and heating was performed at 90° C. for 30 minutes.

This solution was allowed to stand at normal temperature, and then filtration, washing with water, and drying were performed by a conventional method. Thereafter, the dried product was pulverized by a sample mill, to obtain 118 parts of a pigment composition containing the triazine compound represented by formula (12) and an azo yellow pigment C. I. Pigment Yellow 74. The content of o-anisidine in the obtained pigment composition was measured as described above.

Examples 2 to 4, Comparative Examples 1 and 2

Pigment compositions were prepared in the same manner as in Example 1, except that the type of the o-anisidine remover was changed to ones in Table 1, and the content of o-anisidine in each pigment composition was measured.

Table 1 shows the production conditions and the results of measurement of the o-anisidine contents of Examples 1 to 4 and Comparative Examples 1 and 2. In Table 1, the "remover" means the o-anisidine remover; "OA" means o-anisidine; "DBM" means dibutyl maleate; "DES" means diethyl sebacate; "DBP" means dibutyl phthalate; "BD" means butyl decanoate: "BA" means butyl acetate; and "MA" means maleic acid.

TABLE 1

|  |  | Example | | | | Comparative Example | |
| --- | --- | --- | --- | --- | --- | --- | --- |
|  |  | 1 | 2 | 3 | 4 | 1 | 2 |
| Coupler excess amount | [%] | 0.8 | 0.8 | 0.8 | 0.8 | 0.8 | 0.8 |
| Remover |  | DBM | DES | DBP | BD | BA | MA |
| Remover added amount | [% to pigment] | 8 | 8 | 8 | 8 | 8 | 8 |
| Remover addition time |  | A | A | A | A | A | A |
| OA content | [mg/kg] | 4 | 4 | 5 | 17 | 85 | 73 |

In the Table, "A" means that the remover was added between after the coupling reaction and before the heating treatment was performed.

Example 5

A pigment composition was prepared in the same manner as in Example 1, except that a coupler solution was prepared such that the excess amount of the coupler was 4.8%, and the added amount of the remover was 5 parts per 100 parts of the pigment (5% to pigment), and the content of o-anisidine in the pigment composition was measured.

Example 6

A pigment composition was prepared in the same manner as in Example 5, except that the added amount of the o-anisidine remover was 10 parts per 100 parts of the pigment (10% to pigment), and the content of o-anisidine in the pigment composition was measured.

Example 7

In the same manner as in Example 5, a diazotized solution and a coupler solution were prepared, coupling reaction was carried out, and then heating was performed at 90° C. for 30 minutes. This solution was allowed to stand until cooled to normal temperature, then dibutyl maleate was added to the solution, and the solution was agitated for 1 hour. Thereafter, filtration, washing with water, and drying were performed by a conventional method, and then the dried product was pulverized by a sample mill, to obtain 18 parts of a pigment composition containing the triazine compound represented by formula (12) and an azo yellow pigment C. I. Pigment Yellow 74. The content of o-anisidine in the obtained pigment composition was measured as described above.

Example 8

A pigment composition was prepared in the same manner as in Example 5, except that a coupler solution was prepared such that the excess amount of the coupler was 1.6%, and the content of o-anisidine in the pigment composition was measured.

Example 9

A pigment composition was prepared in the same manner as in Example 8, except that the added amount of the o-anisidine remover was 10 parts per 100 parts of the pigment (10% to pigment), and the content of o-anisidine in the pigment composition was measured.

Example 10

A pigment composition was prepared in the same manner as in Example 5, except that a coupler solution was prepared such that the excess amount of the coupler was 0.8% and the content of o-anisidine in the pigment composition was measured.

Comparative Example 3

A pigment composition was prepared in the same manner as in Example 5, except that the o-anisidine remover was not used, and the content of o-anisidine in the pigment composition was measured.

Comparative Example 4

A pigment composition was prepared in the same manner as in Example 8, except that the o-anisidine remover was not used, and the content of o-anisidine in the pigment composition was measured.

Table 2 shows the production conditions and the results of measurement of the o-anisidine contents of Examples 5 to 10 and Comparative Examples 3 and 4. The notations in Table 2 are the same as in Table 1.

In the Table, "B" means that the remover was added between after the heating treatment was performed after the coupling reaction and before filtration.

(Evaluation)

<Evaluation of Use for Toner>

Using each of the pigment compositions of Examples 1 to 4 and Comparative Examples 1 and 2, color toner was produced by the following procedure. First, 60 parts by weight of a linear polyester resin (a bisphenol A ethylene oxide adduct-terephthalic acid condensation product, softening point: 107° C., glass transition point: 63° C.) was put into a kneader as a binding resin, and heated and melted at 110 to 112° C. 40 parts by weight of each of the pigment compositions of Examples 1 to 4 and Comparative Examples 1 and 2 was gradually put into the kneader, and a master batch containing 40% by weight of a pigment component was produced by an ordinary method.

Next, 10 parts by weight of each master batch was dissolved in 90 parts by weight of a tetrahydrofuran solvent, and a yellow pigment dispersion liquid containing 4% by weight of a pigment component was prepared. Each pigment dispersion liquid was spread on a transparent film using a 0.15-mm bar coater, and used as a sample. Each sample was set on an overhead projector (OHP), and a transmission color thereof was visually determined and evaluated on the basis of the following criteria.

Excellent: Very clear yellow is exhibited and the sample can be used as a colorant for color toner.

Good: Clear yellow is exhibited and the sample can be used as a colorant for color toner.

Fair: Slightly reddish yellow is exhibited and dullness in color is observed, but there is no practical problem.

Poor: Light to dark brown is exhibited and the sample cannot be used as a colorant for color toner.

<Evaluation of Use for Inkjet Ink>

Using each of the pigment compositions of Examples 1 to 4 and Comparative Examples 1 and 2, inkjet ink was produced by the following procedure. First, 7.5 parts by weight of each of the pigment compositions of Examples 1 to 4 and Comparative Examples 1 and 2, 4 parts by weight of a dispersant (Joncryl 61J, manufactured by BASF), 5 parts by weight of isopropyl alcohol, 13.5 parts by weight of deionized water, and glass beads (diameter: 2.5 to 3.5 mm) were put into a 140-mL glass container and dispersed using a paint conditioner for 60 minutes. Next, 20 parts by weight of a dispersant (Joncryl 7001, manufactured by BASF) was further added and similarly dispersed for 5 minutes, and then the glass beads were removed, to prepare each inkjet ink. The ink was spread on a polypropylene film using a bar coater such that a wet film thickness was 0.15 µm, and the spread ink was dried. For each thin film obtained, transparency was visually confirmed and evaluated on the basis of the following criteria.

TABLE 2

|  |  | Example | | | | | | Comparative Example | |
| --- | --- | --- | --- | --- | --- | --- | --- | --- | --- |
|  |  | 5 | 6 | 7 | 8 | 9 | 10 | 3 | 4 |
| Coupler excess amount | [%] | 4.8 | 4.8 | 4.8 | 1.6 | 1.6 | 0.8 | 4.8 | 1.6 |
| Remover |  | DBM | DBM | DBM | DBM | DBM | DBM | None | None |
| Remover added amount | [% to pigment] | 4 | 8 | 4 | 4 | 8 | 4 | — | — |
| Remover addition time |  | A | A | B | A | A | A | — | — |
| OA content | [mg/kg] | 7 | 4 | 19 | 5 | 1 | 4 | 77 | 36 |

In the Table, "A" means that the remover was added between after the coupling reaction and before the heating treatment was performed.

Excellent: The transparency is very good.
Good: The transparency is good.
Poor: The transparency is poor (opacity)

In the evaluation of use for toner and use for inkjet ink, each Example was "good" and confirmed to have no practical problem. Due to the treatment with the remover performed when making the content of o-anisidine derived from the coupler to be equal to or less than 20 mg/kg in the entire pigment composition, there was a concern about a decrease in transparency in the toner or the inkjet ink, but it was found that there was no practical problem. In addition, from the results of the inkjet ink, it can be expected that each pigment composition is applied to a color filter.

What is claimed is:

1. A method for producing a pigment composition, the method comprising:
    after reaction between a coupler and a base to generate an azo pigment, or during the reaction between the coupler and the base, adding a compound represented by formula (a) below as a remover for o-anisidine derived from the coupler,

[Chem. 2]

$$W^2\text{—}COOW^1 \quad (a)$$

wherein $W^1$ represents an aliphatic hydrocarbon group and $W^2$ represents a group having at least one carboxylic acid alkyl ester group, or an aliphatic hydrocarbon group having two or more carbon atoms; and
    washing the azo pigment with water after the addition of the compound represented by formula (a).

2. The method for producing a pigment composition according to claim 1, wherein the compound represented by formula (a) which is added as the remover for o-anisidine is at least one member selected from dibutyl maleate, diethyl sebacate, dibutyl phthalate, and butyl decanoate.

3. The method for producing the pigment composition according to claim 1, further comprising performing heating in the presence of the remover for o-anisidine.

4. The method of claim 1 further comprising the step of adding a pigment derivative, wherein the pigment derivative is a triazine compound represented by formula (1):

[Chem. 1]

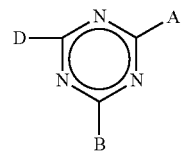

(1)

wherein A represents an acidic group or a basic group; B represents —OH, —Cl, an acidic group or a basic group; and D represents —H, —Cl, —OH, or an aromatic amine residue.

5. The method of claim 1 wherein the compound represented by formula (a) is added during the reaction between the coupler and the base.

6. The method of claim 1 wherein the compound represented by formula (a) is added in an amount of 2 to 40 parts by weight of the azo pigment.

* * * * *